(12) United States Patent
So (10) Patent No.: US 12,380,211 B2
(45) Date of Patent: Aug. 5, 2025

(54) METHOD AND APPARATUS FOR DETECTING DISABLEMENT OF DATA BACKUP PROCESSES

(71) Applicant: ARRIS Enterprises LLC, Suwanee, GA (US)

(72) Inventor: Nicol C. P. So, Newtown, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 195 days.

(21) Appl. No.: 18/226,535

(22) Filed: Jul. 26, 2023

(65) Prior Publication Data

US 2024/0054217 A1 Feb. 15, 2024

Related U.S. Application Data

(60) Provisional application No. 63/396,481, filed on Aug. 9, 2022.

(51) Int. Cl.
G06F 21/56 (2013.01)
G06F 11/14 (2006.01)
G06F 21/60 (2013.01)

(52) U.S. Cl.
CPC ........ *G06F 21/565* (2013.01); *G06F 11/1451* (2013.01); *G06F 21/602* (2013.01)

(58) Field of Classification Search
CPC .................................................... G06F 21/565
See application file for complete search history.

(56) References Cited

U.S. PATENT DOCUMENTS

2012/0198241 A1* 8/2012 O'Hare ................. G06F 21/602 713/189
2016/0352827 A1* 12/2016 Procopio ............. G06F 11/1464

* cited by examiner

*Primary Examiner* — Simon P Kanaan
(74) *Attorney, Agent, or Firm* — Chernoff, Vilhauer, McClung & Stenzel, LLP (57) ABSTRACT

A method and apparatus for detecting disablement of a data backup process disclosed. The system inserts and periodically updates authenticatable sentinel data objects in the primary system. After the backup occurs, the backup data with the sentinel data objects are read and the sentinel data objects are detected and authenticated. If any of the sentinel data objects are not detected or cannot be authenticated, the system informs an administrator that the data backup has failed at least in part.

20 Claims, 5 Drawing Sheets

METHOD AND APPARATUS FOR DETECTING DISABLEMENT OF DATA BACKUP PROCESSES

CROSS-REFERENCE TO RELATED APPLICATIONS

The present application claims priority to U.S. Provisional Patent Application No. 63/396,481 filed Aug. 9, 2022, the content of which is incorporated by reference herein.

BACKGROUND

1. Field

The present disclosure relates to systems and methods for backing up data, and in particular to a system and method for detecting backup data failures and disablements.

2. Description of the Related Art

Malware is software intentionally designed to interfere with the normal operation of a digital processing system. Ransomware is a type of malware that is intended to facilitate extortion. Ransomware may encrypt the victim's data to render it unusable without a decryption cryptographic key. Until such data is unlocked, the unavailability of the victim's data disrupts the victim's operations. Payment is demanded from the victim in exchange for releasing the decryption key or a decryption tool that will decrypt or unlock the data. Ransomware attackers may also exfiltrate the victim's data during an attack and extort payment from the victim by threatening to release the stolen data, which may cause embarrassment, compromise of trade secrets, reputational damage, loss of trust, and/or incurrence of legal liabilities.

Risk from ransomware may be reduced by antivirus software, firewalls, securing networks from intrusion. Risk from ransomware may also be reduced by regularly backing up data and isolating those backups from infection, because the victim should be able to quickly resume operations by restoring the encrypted data from data backups so long as sufficiently recent data backups are available. Even in situations where the threat to release the stolen data remains, if the victim is able to recover from the ransomware attack using data backups, the likelihood of a ransom payment is significantly reduced.

However, some ransomware attackers are motivated to disable, destroy, or infect back up data. One of the ways to prevent such acts is to assure that the backup data is immutable or unable to be changed. This can be implemented in a variety of ways, including physical removal of the backup storage media after the backup takes place. But even if the backup data cannot be erased, overwritten, or otherwise compromised, it is still important to have assurance that the data backup system is functioning normally, and that the data is in fact being backed up to alternate storage. This may not be the case, for example, because the backup has been fully or partially disabled, whether by the user, malware, or mistake.

Accordingly, there is a need for a robust technique of timely detecting the disablement of backup operations.

SUMMARY

To address the requirements described above, this document discloses a system and method for detecting disablement of the backing up of a specified portion of the data in a system comprising a primary data storage device for storing data and a processor implementing a data backup agent for retrieving a specified portion of the data and providing the specified portion of data for storage in a backup storage device, a method of detecting disablement of the backup of the specified portion of the data. In one embodiment, the method comprises: inserting one or more sentinel data objects into the specified portion of the data, each sentinel data object comprising an associated authenticator and temporal data; determining if the one or more sentinel data objects are included in a backup of the specified portion of the data stored in the backup storage device. The method determines if any of the one or more sentinel data objects is not included in the backup of the specified portion of the data stored in the backup storage device, and if so, provides an indication of the disablement of the backup of the specified portion of the data. The method further determines if all of the one or more sentinel data objects are included in the backup of the specified portion of the data stored in the backup storage device, and if so, extracts the one or more of the sentinel data objects from the backup of the specified portion of the data. The method also determines if each of the extracted sentinel data objects is up to date, and passes authentication according to a verification key associated with the authenticator associated with the extracted sentinel data object and if any of the extracted sentinel data objects is not up to date or fail authentication, provides the indication of the disablement of the backup of the specified portions of the data.

Another embodiment is evidenced by a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Described below is a system in which a sentinel data object inserter in the primary system inserts and periodically updates one or more sentinel data objects in the primary data storage. Those inserted sentinel data objects are included among the data that is backed up in backup storage. The sentinel data object also includes temporal data, such as a timestamp or sequence number, from which the freshness or recency of the sentinel data object may be determined. The sentinel data object inserter has access to a cryptographic key that is used to generate an authenticator within each sentinel data object. An authenticator, as the term is used herein, is data, not a device. The authenticator may be a message authentication code (MAC), based on symmetric key cryptography, a digital signature (based on public key cryptography), or a similar cryptographic check value. The authenticator is computed at least partly based on, and thereby able to authenticate, the temporal data. Other constituents of the sentinel data object, such as padding, if present, may optionally be included in the data authenticated by the authenticator.

In a backup system communicatively coupled to the primary system, a sentinel data object detector periodically extracts one or more of the sentinel data objects included in the backup data in backup storage. To accomplish this, the sentinel data object detector may be provided with information regarding the locations of the sentinel data objects and the expected update scheduling. This may be realized through the use of a sentinel data object detector configuration. In a similar manner, matching information regarding the locations of the sentinel data objects may be provided to the sentinel data object inserter through the use of a sentinel data object inserter configuration. The sentinel data object inserter configuration may be stored in backup data storage 114 or elsewhere in the backup system 104. The sentinel data object detector has one or more cryptographic key(s) that can be used to validate the authenticators that the sentinel data object inserted included into each sentinel data object. Depending on the cryptographic technique used to generate an authenticator, the associated key possessed by the sentinel data object detector may be a MAC key or a public signature verification key of a public-private key pair.

If expected updates to the sentinel data objects are not detected for too long of a time interval (which may be an administrator-configurable threshold), an alarm is generated. Such an alarm may be an entry in a security event log, which may be monitored by a monitoring system. Notifications can be sent to administrative staff (e.g. by instant messages, email, text and/or phone call), and automated protective measures may be triggered.

Figure 1:
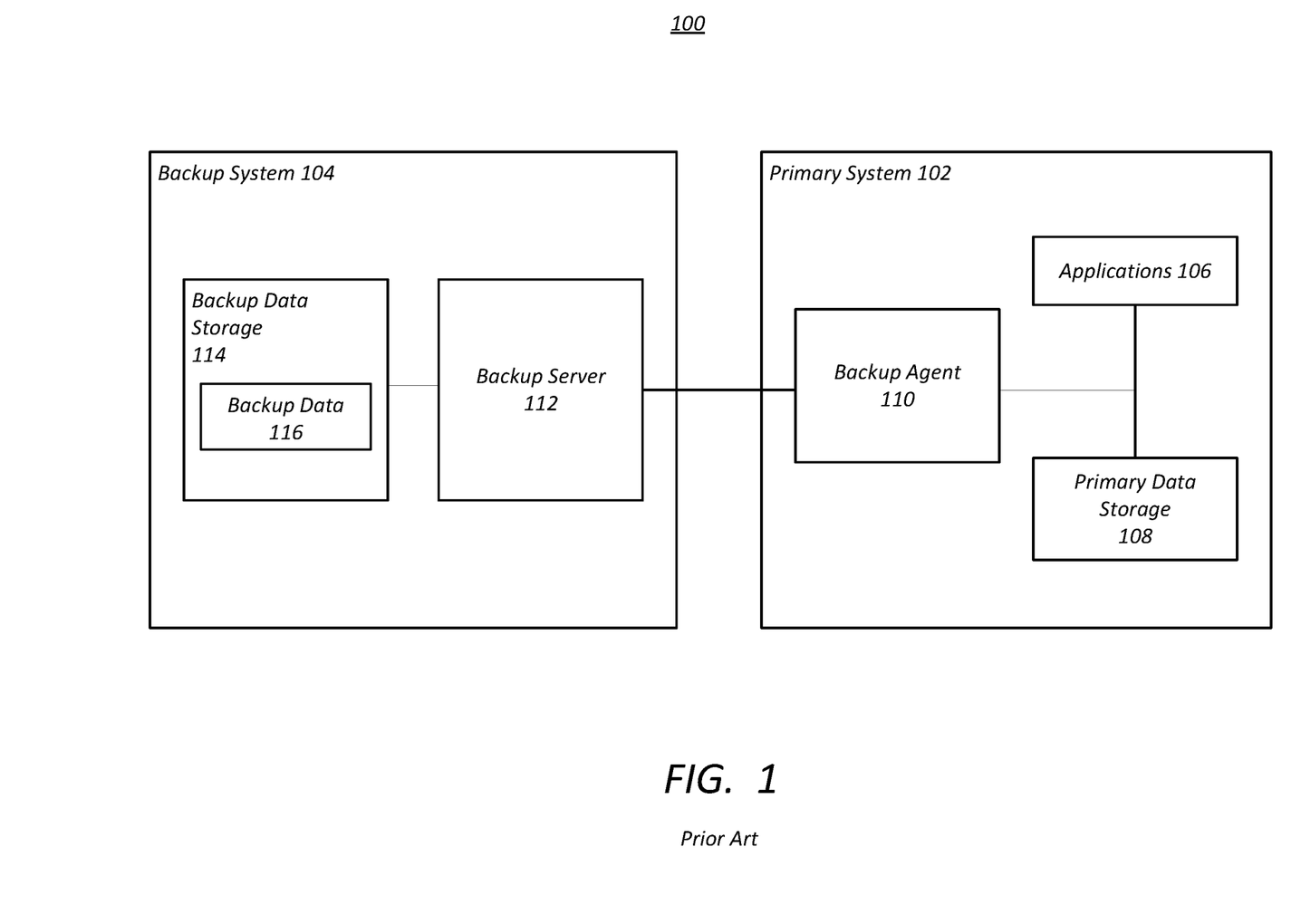
FIG. 1 is a diagram of a prior art processing system.

FIG. 1 is a diagram of a prior art processing system 100. The processing system 100 includes a primary system 102 communicatively coupled to a backup system 104. The primary system 102 implements the basic functionality of the processing system 100 by executing applications 106 and reading and writing data to the primary data storage 108, whereas the function of the backup system 104 is to back up data that is stored in primary data storage 108. A backup agent 110 communicatively coupled to the primary data storage 108, reads portions (or all) of the data stored in the primary data storage 108 that are specified for backup by a system administrator, retrieves that specified portion of the data and provides that portion of the data to the backup system 104 for storage. Typically, a system administrator or manager uses an interface to specify which portions (e.g. files) of the primary data storage 108 are to be backed up, when such backing up of the data is to take place, and other parameters describing the backup process. For example, using the backup agent 110, the administrator can specify that certain files or all the files in particular directories and/or subdirectories are backed up daily at 11 PM. As another example, the backup operation may be performed much more frequently, say every few minutes or even more frequently. Also using the backup agent 110, the administrator can determine whether the backup is incremental (e.g. only those files which have changed since the last back up), complete (in which all files are backed up), and whether the files are compressed before being backed up. The backup agent 110 is installed as a special application in the primary system 102 and interfaces with the operating system of the primary system 102 to achieve the backup.

The backup agent 110 provides the data to be backed up (e.g. backup data 116) to the backup system 104 for storage in the backup data storage 114. The backup system 104 may be physically co-located with the primary system 102 or may be remote from the primary system (for example, in a cloud computing infrastructure), which includes backup server 112 to interface with the primary system 102. The backup server 112 of the backup system 104 receives the to-be-backed-up data from the primary system 102 and stores the backup data 116 in the backup data storage 114. The backup storage 114 may include removal storage devices or media, which may take the forms of detachable hard drive(s), solid state drive(s) (SSD), or magnetic tape drive(s), among others.

Figure 2:
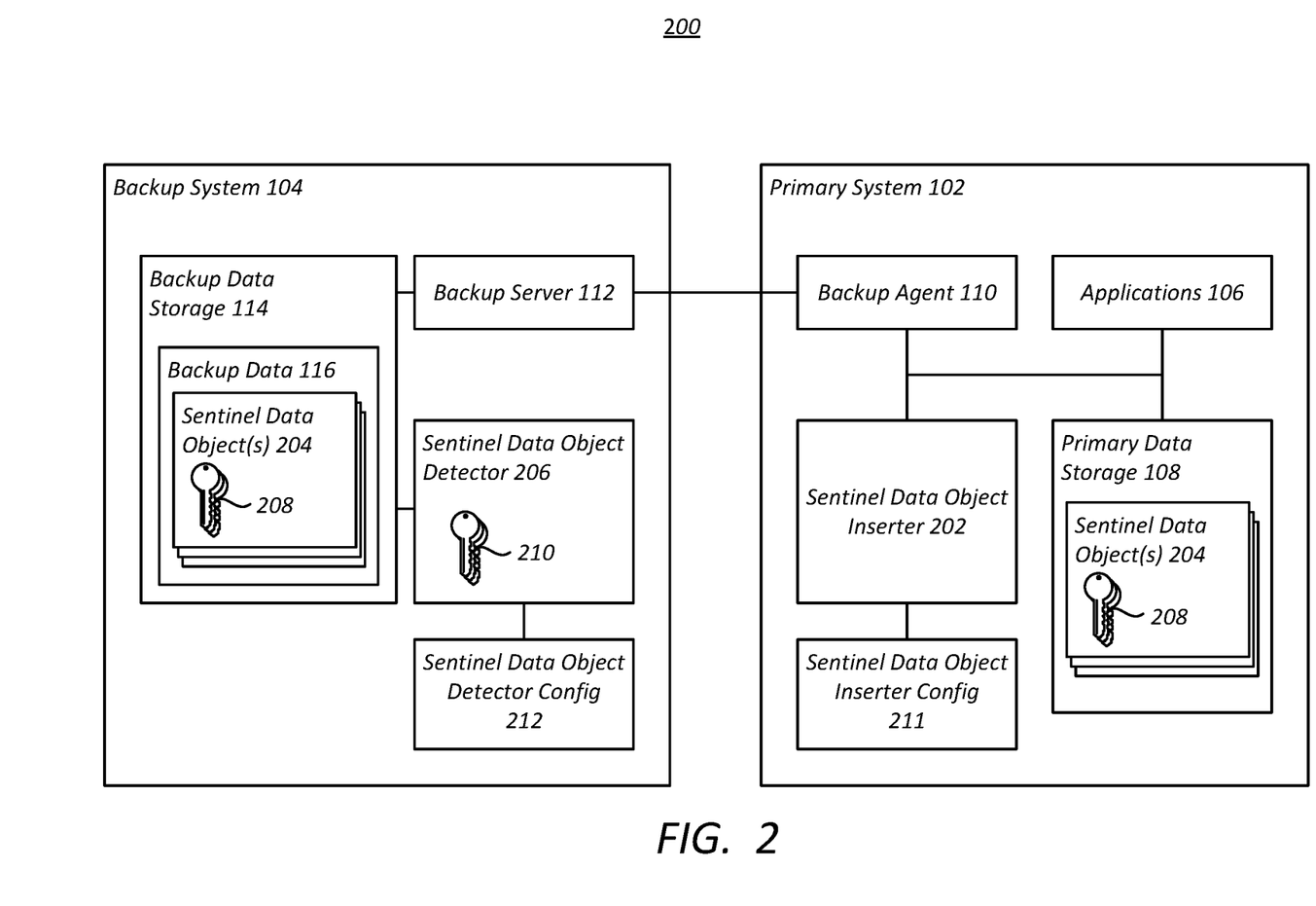
FIG. 2 is a diagram illustrating an improved processing system.

FIG. 2 is a diagram illustrating an improved processing system 200. The primary system 102 of the improved processing system 200 includes a sentinel data object inserter 202, backup agent 110, primary data storage 108, and applications 106, where the sentinel data object inserter 202 and backup agent 110 are communicatively coupled to the primary data storage 108. The backup system 104 further comprises a sentinel data object detector 206 communicatively coupled to the backup data storage 114.

Figure 3:
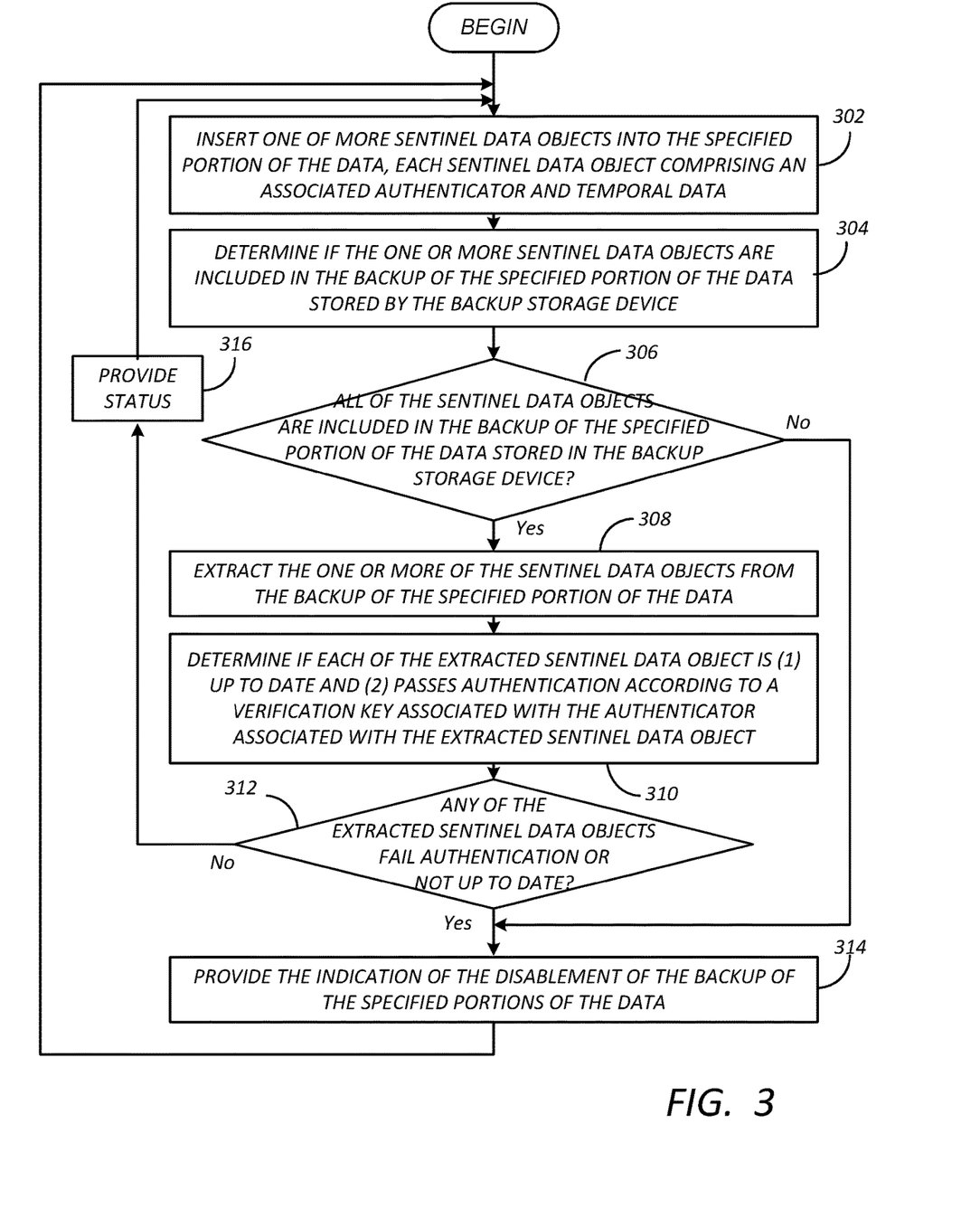
FIG. 3 is a diagram presenting exemplary operations that can be used to detect disablement of the backup of a portion of data stored in primary data storage.

FIG. 3 is a diagram presenting exemplary operations that can be used to detect disablement of the backup of a portion of data stored in primary data storage 108. The administrator has instructed the backup agent to back up a specified portion of the data stored in the primary data storage 108. The administrator specifies which portion of the data is to be backed up, when it is to be backed up, and where the backup is to be stored. The time the backup is to take place can be on a particular date and time (including an immediate backup), or on a particular schedule. The specific portion(s) of the data to be backed up can be specified in terms of particular file names, locations (e.g. folders) of files, devices, volumes, database objects (e.g. databases, tables), and/or according to selection criteria based on metadata, such as the creation date, modification date, size, or file extension.

In block 302, the sentinel data object inserter 202 generates or obtains the sentinel data objects and inserts one or more sentinel data objects 204 into the specified portion(s) of the data to be backed up.

Figure 4:
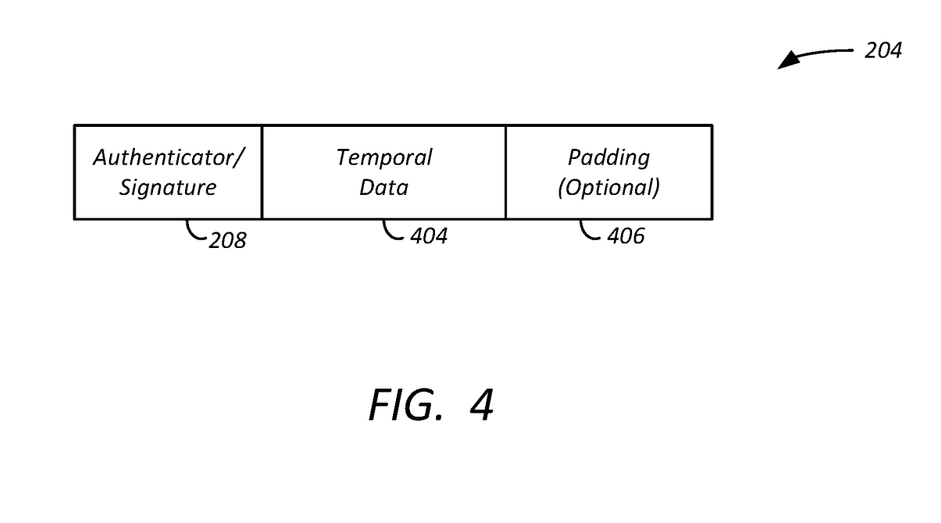
FIG. 4 is a diagram illustrating an example of a sentinel data object.

FIG. 4 is a diagram illustrating an example of sentinel data object 204. Each sentinel data object 204 comprises an authenticator 208, and temporal data 404, and optional padding 406. In this context, temporal data refers to any data that can be used to determine when the sentinel data object was inserted and can include, for example, a time/date stamp, a sequence number, a counter that updates at a predictable rate, or other similar data artifacts. The temporal data and the authenticator 208 are later used to authenticate that the sentinel data object 204.

The sentinel data objects 204 can be inserted into the specified portion of the data to be backed up in different locations within the specified portion of the data and using different techniques. In one embodiment, the sentinel data objects 204 are inserted into pseudorandom locations within the specified portion of the data. Suppose for example, that the specified portion of the data includes a data folder having a plurality of files. In this instance, the sentinel data objects 204 may comprise additional data objects or files that are inserted, in a manner incorporating pseudorandom choices, among those plurality of files. The sentinel data object may optionally comprise multiple files, each containing a portion of the sentinel data object and together comprising the entire sentinel data object. Whether split among a plurality of files or included in a single file, the filename (or filenames) of the sentinel data objects may be pseudorandom, or may be chosen to be similar to other files in the directory or other operating system files or application files. A sentinel data object 204 may be embodied as data stored in a file system, such as a file, a directory (a.k.a. a folder), or metadata associated with a file or a directory. A sentinel data object 204 may also be embodied as an object in a database, such as a record in a file of records. In relational databases, a sentinel data object 204 may be embodied as a row in a table, or table, which may be dynamically created. In another type of databases, a sentinel data object 204 may be embodied as a key-value pair in a key-value store. A sentinel data object may or may not be accessible as an object in a file system or even inside an object in a file system. For example, some databases are known to be able to use disk partitions or logical volumes as raw devices without a file system.

In order that the sentinel data objects 204 stored in the backup data storage 114 can be detected, the location of each of the sentinel data objects 204 needs to be available to the sentinel data object detector 206. Information about the locations of sentinel data objects 204 may be stored as part of the sentinel data object detector configuration 212. As another example, the sentinel data object inserter 202 may record the location of the sentinel data objects 204 within the portion of the data designated for backup as stored in the primary data storage 108 and provide those locations to the backup system 104. Such locations may include, for example, the location of files inserted among other files in the backup data 116. In one embodiment, location data may take the form of paths (also known as pathnames or file system paths), as the term is known in operating system literature; such paths provide the sentinel data object detector 206 with the capability to find the sentinel data objects within the backup data 116.

In such embodiments, the locations of the one or more sentinel data objects are provided for storage in the backup system 104, for example, in backup data storage 114 or other auxiliary storage. When the time arrives to check to assure that the backup has occurred, the sentinel data object detector 206 retrieves the location of the one or more sentinel data objects from the backup system 104, uses this location data to retrieve the sentinel data objects, and determines whether the expected sentinel data objects are included in the backup data 116.

The inserted sentinel data objects 204 may be updated according to a schedule or upon command of the administrator. The parameters that affect the behavior of the sentinel data object inserter 202 may be provided as a sentinel data object inserter configuration 211. For example, the administrator may command the sentinel data object inserter 202 to update any inserted sentinel data objects (which may be found using the location information described above) to update the temporal data contained therein and/or to respond to a change in the sentinel data object inserter configuration 211. Upon such updating, the authenticator 208 included within the sentinel data object 204 is also updated to match the authenticated data in the remainder of the sentinel data object 204.

At the time determined by the administrator, the specified portion of the data (e.g. the files specified to be backed up), which includes the sentinel data objects, are copied from the primary data storage 108 and stored in the backup data storage 114 of the backup system 104.

In block 304, the sentinel data object detector 206 determines if all of the sentinel data objects 204 are included in the backup data 116 (e.g. the of the specified portion of the data stored by the backup data storage device 114). If any of the sentinel data objects 204 are not included in the backup data 116, block 306 routes processing to block 314, which provides an indication that the backup of the specified portions has/had been disabled. The indication may be an entry in a security event log, which may be monitored by a monitoring system. The indication can also be provided to the administrator in the form of an email, an annunciator on the administrator's console, or other means. The indication may include diagnostic data to help the administrator determine why/how the backup data has stopped being updated. For example, the locations of the backup files not having an up-to-date sentinel data object may be included with the indication.

If all of the sentinel data objects 204 are included in the backup data 116, block 306 routes processing to blocks 308-312, which authenticate the sentinel data objects 204 to assure that sentinel data objects are authentic and as they were generated by the sentinel data object inserter 202. Turning first to block 306, the sentinel data object detector 206 extracts the one or more of the sentinel data objects from the backup of the specified portion of the data. Block 310 then determines if each of the extracted sentinel data objects 204 is up to date and passes authentication using a verification key 210 corresponding to the authenticator 208 associated with the sentinel data object 204. A sentinel data object 204 is not up to date (or synonymously, stale) if an expected update of its temporal data 404 is not seen for too long of a time interval. For example, if the sentinel data object inserter 202 is known to update all inserted sentinel data objects 204 every N seconds, and the temporal data 404 in a retrieved sentinel data object 204 has not changed and the elapsed time since the last valid update of it exceeds a predetermined threshold (which should be longer than N seconds), the sentinel data object 204 may be deemed stale. As another example, if the sentinel data object inserter 202 is known/assumed to have an accurate clock and the temporal data 404 is a timestamp, a retrieved sentinel data object 204 may be determined to be stale if temporal data 404 in it trails the current time by an amount larger than a predetermined threshold. Multiple criteria for staleness can be formulated, partly depending on the exact form of the temporal data 404 and partly depending on the likelihood of minor, benign timing errors that need to be accommodated. If any of the extracted sentinel data objects fails authentication or is stale, block 312 routes processing to block 314, which provides an indication that the backup of the specified portion of the data has been disabled. The indication may take various forms, as described earlier. The indication may also include reference(s) the portion(s) of the backup data where the missing or invalid sentinel data object(s) were to be found. Authentication of the sentinel data object 204 may comprise verifying the sentinel data object 204 by use of the authenticator 208 and the verification key 210. In one embodiment, the authenticator 208 is a digital signature used to verify the authenticity of the sentinel data object 204, and the verification key 210 is a public key used to validate the sentinel data object. The generation of the digital signature may, but not necessarily, involve computing a hash value from the data to be signed, thereby reducing the data to be signed to a succinct representative value, before applying a public key operation to the hash value.

If all of the extracted sentinel data objects 204 pass authentication, block 312 routes processing to optional block 316, which provides status of the backup data to the administrator, then routes processing back to block 302 for the next scheduled or commanded insertion of sentinel data objects into the specified portion of the data (including, for example, new data files). If any of the extracted sentinel data objects 204 do not pass authentication, processing is routed to block 314, which provides an indication that the backup of the specified portions of the data has been disabled. After providing such indication, processing returns to block 302 to begin anew and assure that the backup disablement detection continues to function.

The operations of blocks 304-316 can be performed repetitively and asynchronously relative to the timing of the insertion of sentinel data object(s) in block 302. Alternatively, the operations of blocks 304-316 can be performed in coordination with the timing of the backup of the specified portion of the data. For example, the operations of 304-316 can be performed after a delay after the backup of the specified portion of the data is supposed to have occurred. These operations are preferably executed repeatedly according to a regular or approximately-regular schedule, to provide continuing assurance that backup operation has not been totally or partially disabled.

The sentinel data objects 204 may be inserted into the backup data 116 in different ways. In one embodiment, a sentinel data object 204 is inserted as a file in a part of a file system that is included in a backup operation. A sentinel data object 204 so inserted may get incorporated into a data object comprising multiple constituent data objects. For example, if the backup data comprises a plurality of files that are packaged into a single file before being supplied to the backup storage device 114, a sentinel data object may be used to signal that the single compressed file having the plurality of files has been backed up.

Notably, the sentinel data objects 204 may be inserted into the specified portion of the data to be backed up in advance of, during, or immediately after the commencement of the actual backup process. The lack of requirements for coordination between the backup process and sentinel data object insertion means that embodiments of the present invention can be deployed with existing implementations of backup systems without modifying the latter. However, it is also possible to deploy embodiments of the present invention with coordination with the backup system. For example, if the administrator has designated files meeting specified criteria (e.g. located in specified folders) to be backed up according to a particular schedule, the sentinel data object inserter 202 may insert the sentinel data objects 204 among the appropriate files in the primary data storage in advance of those files (now including the sentinel data objects 204) being retrieved and provided for backup.

To make it more difficult for malware to identify a data object as a sentinel data object, sentinel data objects 204 may optionally include data padding. The presence and amount of padding in sentinel data objects 204 may vary from one instance to another, and/or from one update to another. For example, the sentinel data object inserter 202 may generate the sentinel data object, generate a pseudorandom number, then pad the generated sentinel data object with a number of bytes equal to the generated pseudorandom number. Further, the padding data itself can be randomized, so that data patterns in the padding cannot be used to easily identify sentinel data objects 204. Sentinel data objects 204 may also be given pseudorandom file names or file names with pseudorandom elements in order to conceal their nature. When sentinel data objects have pseudorandom names, matching seed values can be provided in both the sentinel data object insert configuration 211 and the sentinel data object detector configuration 212, to enable the sentinel data object detector 206 to re-derive the pseudorandom names generated by the sentinel data object inserter 202.

The sentinel data objects 204 may also be encrypted by the sentinel data object inserter 202 according to an encryption key to prevent analysis of the sentinel data objects 204 to attack the system. Such sentinel data objects 204 are decrypted by the sentinel data object detector 206 after extraction and before authentication.

In one embodiment, the sentinel data object inserter 202 comprises an obfuscated executable image. This makes it more difficult for malware or an attacker of the primary system 102 to identify and/or modify the operations of the sentinel data object inserter. Many code obfuscation techniques are known; implementations of code obfuscation technologies and tools are available commercially. A body of literature on code obfuscation exists. Many academic/scholarly references on the subject can be located by querying search engines (such as Google Scholar) using "code obfuscation" and similar query terms. The particular code obfuscation technique(s) applied is not critical. The obfuscated executable image may be obfuscated by using complex phrases and circular or redundant logic, stripping out potentially revealing metadata, adding unused or meaningless code labels to make the code difficult for the reader to understand, or spreading the code for the sentinel data object inserter in different portions of the application or operating system. In another embodiment, the executable image may be obfuscated by encrypting some or all of the program code. In still another embodiment the obfuscated executable image includes data obfuscated using white box cryptographic techniques. Whitebox cryptography is a technology that protects cryptographic operations in software code from attackers who could observe the executable of the software code, e.g. using a debugger or simulator. Unlike a standard cryptographic engine performing decryption or encryption using an unobscured key that is separate from code implementing cryptographic operations, a whitebox cryptographic engine includes a representation where one or more secret keys are embedded, in a randomized form, in software code in such a way that the secret key(s) in their original forms are not readily identifiable from the software code. The secret cryptographic key(s) are essentially embedded into code having a cascade of transformations (typically implemented as look-up tables whose creation incorporates random choices). The combined effect of the transformations will generate the same output as the standard cryptographic engine, but without the key(s) being readily identifiable.

In still another embodiment, a plurality of executable images or versions of the sentinel data object inserter 202 are available for installation on the primary system 102, and the particular executable image or version selected for installation on one primary system 102 differs from the executable image or version selected for installation on another primary system 102. This makes the particular implementation of the sentinel data object inserter 202 more difficult to identify to malware or an attacker attempting to find and bypass the sentinel data object inserter.

Hardware Environment

Figure 5:
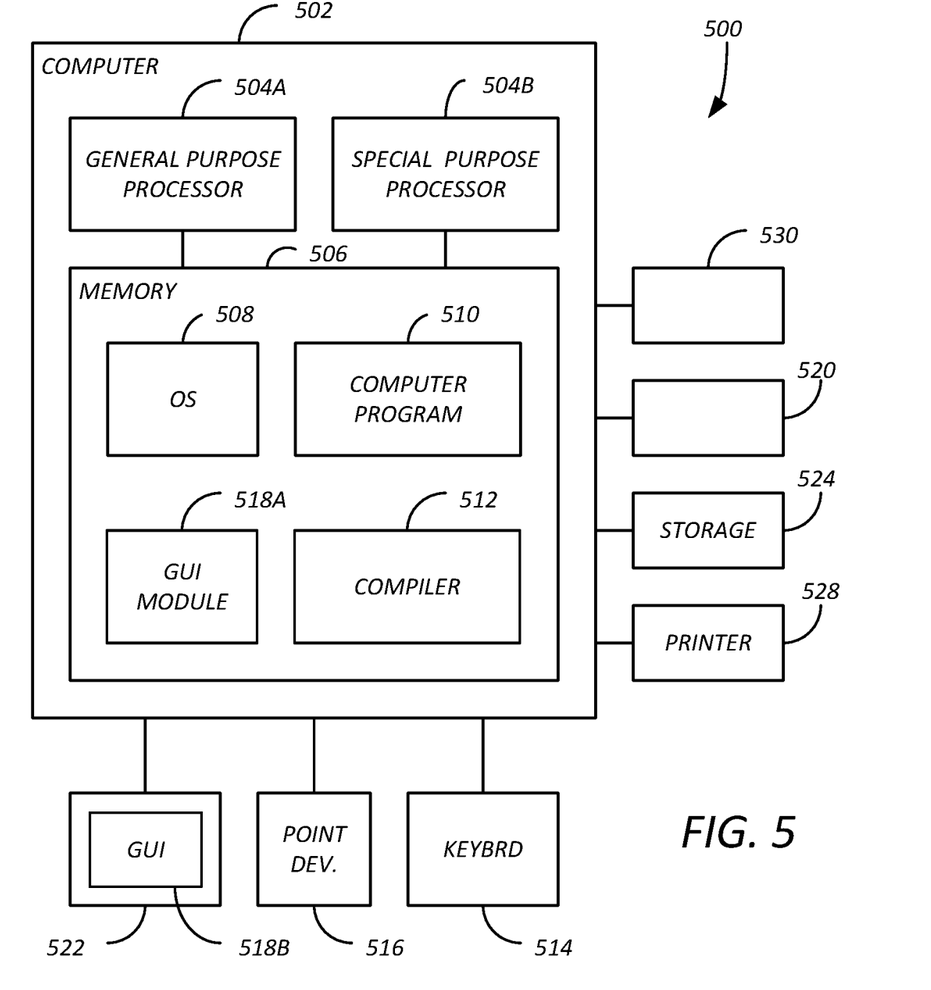
FIG. 5 illustrates an exemplary computer system that could be used to implement processing elements of the above disclosure.

FIG. 5 illustrates an exemplary computer system 500 that could be used to implement processing elements of the above disclosure, including the primary system 102, including the backup agent 110, and sentinel data object inserter 202, as well as the backup system 104, including the backup server 112 and the sentinel data object detector 206. The computer system 500 includes a computer 502 that comprises a processor 504 and a memory 506, such as random access memory (RAM). The memory 504 stores data and processor instructions that, when performed by the processor, implement the operations described herein. The computer 502 is operatively coupled to a display 522, which presents images such as windows to the user on a graphical user interface 518B. The computer 502 may be coupled to other devices, such as a keyboard 514, a mouse device 516, a printer 528, etc. Of course, those skilled in the art will recognize that any combination of the above components, or any number of different components, peripherals, and other devices, may be used with the computer 502.

Generally, the computer 502 operates under control of an operating system 508 stored in the memory 506, and interfaces with the user to accept inputs and commands and to present results through a graphical user interface (GUI) module 518A. Although the GUI module 518B is depicted as a separate module, the instructions performing the GUI functions can be resident or distributed in the operating system 508, the computer program 510, or implemented with special purpose memory and processors. The computer 502 may optionally implements a compiler 512 which allows an application program 510 written in a programming language such as C, Java, COBOL, C++, FORTRAN, or other language to be translated into code executable by processor 504. The application 510 implements algorithmic processes and accesses and manipulates data stored in the memory 506 of the computer 502. The application 510 may be compiled from source code on computer system 510. Alternatively, the application 510 may be developed and built on another computer system and then installed on to computer system 500. The computer 502 also optionally comprises communication device such as a modem (e.g. a telephone modem, cable modem, satellite modem), an Ethernet interface, an interface device for wireless communication (e.g. Wi-Fi, Bluetooth, mobile wireless data), or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the operations herein described. Computer program 510 and/or operating instructions may also be tangibly embodied in memory 506 and/or data communications devices 530, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

Disclosed is a system and method for detecting disablement of the backing up of a specified portion of the data in a system comprising a primary data storage device for storing data and a processor implementing a data backup agent for retrieving a specified portion of the data and providing the specified portion of data for storage in a backup storage device, a method of detecting disablement of the backup of the specified portion of the data. In one embodiment, the method comprises: inserting one or more sentinel data objects into the specified portion of the data, each sentinel data object comprising an associated authenticator and temporal data; determining if the one or more sentinel data objects are included in a backup of the specified portion of the data stored in the backup storage device. The method determines if any of the one or more sentinel data objects is not included in the backup of the specified portion of the data stored in the backup storage device, and if so, provides an indication of the disablement of the backup of the specified portion of the data. The method further determines if all of the one or more sentinel data objects are included in the backup of the specified portion of the data stored in the backup storage device, and if so, extracts the one or more of the sentinel data objects from the backup of the specified portion of the data. The method also determines if each of the extracted sentinel data objects is up to date, and passes authentication according to a verification key associated with the authenticator associated with the extracted sentinel data object and if any of the extracted sentinel data objects is not up to date or fail authentication, provides the indication of the disablement of the backup of the specified portions of the data.

Other embodiments include:

The above method, wherein: the method further comprises providing a location of each of the one or more sentinel data objects for storage; and determining if the one or more sentinel data objects are included in the backup of the specified portion of the data in the backup storage device comprises: retrieving the location of each of the one or more sentinel data objects; and determining, from the retrieved location of each of the one or more sentinel data objects, if the one or more sentinel data objects are included in the backup of the specified portion of the data stored in the backup storage device.

Any of the above methods, wherein retrieving the location of each of the one or more sentinel data objects; and determining, from the retrieved location, if the one or more sentinel data objects are included in the backup of the specified portion of the data stored in the backup storage device; are performed at a configurable time after a scheduled backup of the specified portion of the data.

Any of the above methods, wherein: the one or more sentinel data objects are inserted according to at least one of: pseudorandom locations within the specified portion of the data; and with pseudorandomly-generated file names.

Any of the above methods, wherein the one or more sentinel data objects are inserted into the specified portion of the data by a sentinel data object inserter executed by the processor, the sentinel data object inserter having an obfuscated executable image.

Any of the above methods, wherein the obfuscated executable image includes data obfuscated using white-box cryptography.

Any of the above methods, wherein: the one or more sentinel data objects are inserted into the specified portion of the data by a sentinel data object inserter executed by the processor, wherein the sentinel data object inserter has an executable image randomly selected from a plurality of executable images for the sentinel data object inserter.

Any of the above methods, wherein: the sentinel data objects include randomized data padding.

Any of the above methods, wherein: the one or more sentinel data objects are encrypted according to an encryption key; and determining if the one or more sentinel data objects are included in the backup of the specified portion of the data stored in the backup storage device further comprises: decrypting the extracted one or more sentinel data objects.

Any of the above methods, wherein: wherein the sentinel data objects are periodically updated.

Any of the above methods, wherein: the sentinel data objects include at least one of: a file type sentinel data object; and a database type data object.

Another embodiment is evidenced by an apparatus for detecting disablement of a backing up of the specified portion of the data, the apparatus comprising: a processor; and a memory, communicatively coupled to the processor. A content of the memory comprises processor instructions for: inserting one or more sentinel data objects into the specified portion of the data, each sentinel data object comprising: an associated authenticator; and temporal data; determining if the one or more sentinel data objects are included in a backup of the specified portion of the data stored in the backup storage device; providing an indication of the disablement of the backup of the specified portion of the data if any of the one or more sentinel data objects is not included in the backup of the specified portion of the data stored in the backup storage device; extracting the one or more of the sentinel data objects from the backup of the specified portion of the data if all of the one or more sentinel data objects are included in the backup of the specified portion of the data stored in the backup storage device; determining if each of the extracted sentinel data object is: up to date, and passes authentication according to a verification key associated with the authenticator associated with the extracted sentinel data object; and providing an indication of the disablement of the backup of the specified portions of the data if any of the extracted sentinel data objects are not up to date or fail authentication.

Other embodiments include:

The above apparatus, wherein: the processor instructions further comprise processor instructions for providing a location of each of the one or more sentinel data objects for storage; and the processor instructions for determining if the one or more sentinel data objects are included in the backup of the specified portion of the data in the backup storage device comprise instructions for: retrieving the location of each of the one or more sentinel data objects; and determining, from the retrieved location of each of the one or more sentinel data objects, if the one or more sentinel data objects are included in the backup of the specified portion of the data stored in the backup storage device.

Any above apparatus, wherein: the processor instructions for retrieving the location of each of the one or more sentinel data objects and for determining, from the retrieved location, if the one or more sentinel data objects are included in the backup of the specified portion of the data stored in the backup storage device are performed at a configurable time after a scheduled backup of the specified portion of the data.

Any above apparatus, wherein: the one or more sentinel data objects are inserted according to at least one of: pseudorandom locations within the specified portion of the data; and with pseudorandomly-generated file names.

Any above apparatus, wherein: the one or more sentinel data objects are inserted into the specified portion of the data by a sentinel data inserter executed by the processor, the sentinel data inserter having an obfuscated executable image.

Any above apparatus, wherein: the obfuscated executable image includes data obfuscated using white-box cryptography.

Any above apparatus, wherein: the one or more sentinel data objects are inserted into the specified portion of the data by a sentinel data inserter executed by the processor, wherein the sentinel data inserter has an executable image randomly selected from a plurality of executable images for the sentinel data inserter.

Any above apparatus, wherein: the sentinel data objects include randomized data padding.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. In a system comprising a primary data storage device for storing data and a processor implementing a data backup agent for retrieving a specified portion of the data and providing the specified portion of data for storage in a backup storage device, a method of detecting disablement of backing up of the specified portion of the data, the method comprising:
    inserting one or more sentinel data objects into the specified portion of the data, each sentinel data object comprising:
        an associated authenticator; and
        temporal data;
    determining if the one or more sentinel data objects are included in a backup of the specified portion of the data stored in the backup storage device;
    if any of the one or more sentinel data objects is not included in the backup of the specified portion of the data stored in the backup storage device, providing an indication of the disablement of the backup of the specified portion of the data;
    if all of the one or more sentinel data objects are included in the backup of the specified portion of the data stored in the backup storage device, extracting the one or more of the sentinel data objects from the backup of the specified portion of the data;
    determining if each of the extracted sentinel data objects is:
        up to date, and
        passes authentication according to a verification key associated with the authenticator associated with the extracted sentinel data object; and
    if any of the extracted sentinel data objects is not up to date or fail authentication, providing the indication of the disablement of the backup of the specified portions of the data.

2. The method of claim 1, wherein:
the method further comprises providing a location of each of the one or more sentinel data objects for storage; and
determining if the one or more sentinel data objects are included in the backup of the specified portion of the data in the backup storage device comprises:
retrieving the location of each of the one or more sentinel data objects; and
determining, from the retrieved location of each of the one or more sentinel data objects, if the one or more sentinel data objects are included in the backup of the specified portion of the data stored in the backup storage device.

3. The method of claim 2, wherein:
retrieving the location of each of the one or more sentinel data objects; and
determining, from the retrieved location, if the one or more sentinel data objects are included in the backup of the specified portion of the data stored in the backup storage device;
are performed at a configurable time after a scheduled backup of the specified portion of the data.

4. The method of claim 2, wherein:
the one or more sentinel data objects are inserted according to at least one of:
pseudorandom locations within the specified portion of the data; and
with pseudorandomly-generated file names.

5. The method of claim 2, wherein:
the one or more sentinel data objects are inserted into the specified portion of the data by a sentinel data object inserter executed by the processor, the sentinel data object inserter having an obfuscated executable image.

6. The method of claim 5, wherein the obfuscated executable image includes data obfuscated using white-box cryptography.

7. The method of claim 2, wherein:
the one or more sentinel data objects are inserted into the specified portion of the data by a sentinel data object inserter executed by the processor, wherein the sentinel data object inserter has an executable image randomly selected from a plurality of executable images for the sentinel data object inserter.

8. The method of claim 1, wherein at least of the one or more sentinel data objects include randomized data padding.

9. The method of claim 1, wherein:
the one or more sentinel data objects are encrypted according to an encryption key; and
determining if the one or more sentinel data objects are included in the backup of the specified portion of the data stored in the backup storage device further comprises:
decrypting the extracted one or more sentinel data objects.

10. The method of claim 1, wherein the one or more sentinel data objects are periodically updated.

11. The method of claim 1, wherein each of the one or more sentinel data objects include at least one of:
a file type sentinel data object; and
a database type sentinel data object.

12. In a system comprising a primary data storage device for storing data and a processor implementing a data backup agent for retrieving a specified portion of the data and providing the specified portion of data for storage in a backup storage device, an apparatus for detecting disablement of backing up of the specified portion of the data, the apparatus comprising:

a processor;
a memory, communicatively coupled to the processor, the memory storing processor instructions comprising processor instructions for:
inserting one or more sentinel data objects into the specified portion of the data, each sentinel data object comprising:
an associated authenticator; and
temporal data;
determining if the one or more sentinel data objects are included in a backup of the specified portion of the data stored in the backup storage device;
if any of the one or more sentinel data objects is not included in the backup of the specified portion of the data stored in the backup storage device, providing an indication of the disablement of the backup of the specified portion of the data;
if all of the one or more sentinel data objects are included in the backup of the specified portion of the data stored in the backup storage device, extracting the one or more of the sentinel data objects from the backup of the specified portion of the data;
determining if each of the extracted sentinel data object is:
up to date, and
passes authentication according to a verification key associated with the authenticator associated with the extracted sentinel data object; and
if any of the extracted sentinel data objects are not up to date or fail authentication, providing an indication of the disablement of the backup of the specified portions of the data.

13. The apparatus of claim 12, wherein:
the processor instructions further comprise processor instructions for providing a location of each of the one or more sentinel data objects for storage; and
the processor instructions for determining if the one or more sentinel data objects are included in the backup of the specified portion of the data in the backup storage device comprise instructions for:
retrieving the location of each of the one or more sentinel data objects; and
determining, from the retrieved location of each of the one or more sentinel data objects, if the one or more sentinel data objects are included in the backup of the specified portion of the data stored in the backup storage device.

14. The apparatus of claim 13, wherein:
the processor instructions for retrieving the location of each of the one or more sentinel data objects and for determining, from the retrieved location, if the one or more sentinel data objects are included in the backup of the specified portion of the data stored in the backup storage device are performed at a configurable time after a scheduled backup of the specified portion of the data.

15. The apparatus of claim 13, wherein:
the one or more sentinel data objects are inserted according to at least one of:
pseudorandom locations within the specified portion of the data; and
with pseudorandomly-generated file names.

16. The apparatus of claim 13, wherein:
the one or more sentinel data objects are inserted into the specified portion of the data by a sentinel data inserter executed by the processor, the sentinel data inserter having an obfuscated executable image.

17. The apparatus of claim 16, wherein the obfuscated executable image includes data obfuscated using white-box cryptography.

18. The apparatus of claim 13, wherein:
the one or more sentinel data objects are inserted into the specified portion of the data by a sentinel data inserter executed by the processor, wherein the sentinel data inserter has an executable image randomly selected from a plurality of executable images for the sentinel data inserter.

19. The apparatus of claim 12, wherein the one or more sentinel data objects include randomized data padding.

20. In a system comprising a primary data storage device for storing data and a processor implementing a data backup agent for retrieving a specified portion of the data and providing the specified portion of data for storage in a backup storage device, an apparatus for detecting disablement of backing up of the specified portion of the data, the apparatus comprising:
means for inserting one or more sentinel data objects into the specified portion of the data, each sentinel data object comprising:
an associated authenticator; and
temporal data;
means for determining if the one or more of the sentinel data objects are included in the backup of the specified portion of the data stored in the backup storage device;
means for providing an indication of the disablement of the backup of the specified portion of the data if any of the one or more sentinel data objects are not included in the backup of the specified portion of the data stored in the backup storage device;
means for extracting the one or more of the sentinel data objects from the backup of the specified portion of the data if all of the one or more sentinel data objects are included in the backup of the specified portion of the data stored in the backup storage device;
means for determining if each of the extracted sentinel data objects is:
up to date, and
passes authentication according to a verification key associated with the authenticator associated with the extracted sentinel data object; and
means for providing the indication of the disablement of the backup of the specified portions of the data if any of the extracted sentinel data objects is not up to date or fails authentication.

\* \* \* \* \*